3,026,356
PROCESS FOR THE PREPARATION OF ORGANO BORON COMPOUNDS
Herbert C. Brown, 1840 Garden St., West Lafayette, Ind.
No Drawing. Filed Apr. 25, 1958, Ser. No. 730,814
9 Claims. (Cl. 260—606.5)

The present invention relates to an improved process for the preparation of organo boron compounds.

It is known that organoboranes can be prepared by the reaction of olefins with alkali metal borohydrides in the presence of Lewis acids such as aluminum chloride. It is also known that organoboranes can be prepared by the reaction of olefins with diborane. Neither of these procedures has been employed to any great extent or in a commercial sense because of particular inherent disadvantages. For example, in the reaction employing the alkali metal borohydrides these materials are expensive and difficult to prepare. Likewise, the process is complex and requires stringent control in order to obtain the organoborane in high yield. The procedure involving the reaction of diborane with an olefin, although basically attractive, suffers the disadvantage in that the reaction is generally slow with low yields.

Accordingly, it is an object of this invention to provide a novel process for the preparation of organoboranes. A further object is to overcome the disadvantages of the prior art processes. A still further object is to provide a process for the manufacture of organoboranes in high yield and purity. These and other objects will be apparent as the discussion proceeds.

It has now been found that organoboranes can be prepared by the reaction of a metal hydride with a boron halide or ester and an unsaturated organic compound. In a preferred embodiment, sodium or lithium hydride is the metal hydride, boron fluoride or chloride is the boron compound, and straight chain α-olefins containing up to about 30 carbon atoms are employed with the reaction being conducted at a temperature between about 25 to 125° C. In a still further preferred embodiment, the reaction is conducted in the presence of a polyether, especially the dimethyl ether of diethylene glycol, which promotes the reaction and provides enhanced solubility of the reactants and products. Thus, an especially preferred embodiment of this invention involves the simultaneous reaction of sodium hydride with boron trifluoride and an α-olefin containing up to about 30 carbon atoms in the presence of the dimethyl ether of diethylene glycol at a temperature between 25 to 125° C.

The process has particular advantage over the prior art procedures. For example, the economical metal hydride is employed rather than the prior art alkali metal borohydrides, the reaction is rapid and essentially quantitative, and the hazards involved in handling diborane are eliminated. Likewise a one-step process may be provided. These and other advantages will become apparent as the discussion proceeds.

The metal hydride employed is a hydride of an element of the first three A-groups of the periodic chart of the elements. (Handbook of Chemistry and Physics, 35th Edition, Chemical Rubber Publishing Co., pages 392–3.) These hydrides may be depicted according to the formula:

$$R_yMH_z$$

wherein R may be hydrogen or a hydrocarbon radical having up to about 30 carbon atoms, M is a metal from the group I–A, II–A or III–A elements, y and z are small whole numbers dependent upon, and the sum of which equals, the valence of M, z must be at least 1, and y can equal 0. Thus stated in another way, this reactant is a simple hydride of a metal of the first three A-groups of the periodic chart wherein said metal may additionally have attached thereto a hydrocarbon radical. The preferred metal hydrides employed are the simple metal hydrides having the formula $MH_z$ wherein z corresponds to the valence of the metal M. Likewise, in an especially preferred embodiment, the group I–A hydrides, particularly sodium hydride, are employed. Thus, typical but non-limiting examples of the hydrides employed include lithium hydride, sodium hydride, potassium hydride, rubidium hydride, magnesium hydride, calcium hydride, strontium hydride, aluminum hydride, gallium hydride, indium hydride, thallium hydride and the substituted hydrides as for example, ethyl magnesium hydride, diethyl aluminum hydride, ethyl aluminum dihydride, octylgallium hydride, decyl calcium hydride, diphenyl thallium hydride and the like, wherein R in the aforementioned formula is a hydrocarbon radical containing up to about 30 carbon atoms and is preferably an alkyl radical having up to about 8 carbon atoms.

In general, the boron compound is a compound which is readily reactive with the aforementioned metal hydrides. Among such compounds are the boron halides and esters. These boron compounds can be depicted by the formula

wherein X, Y and Z can be the same or different and at least one is selected from the group consisting of the halogens and alcohol residues. The halogens include, for example, chlorine, fluorine, bromine, and iodine. Astatine would probably work, but at present no method is known for stabilizing it sufficiently for practical utilization in chemical reactions. The alcohol residues include those in which the hydrocarbon portion contains up to about 18 carbon atoms, being both aliphatic and aromatic radicals. The hydrocarbon portion can, of course, contain other substituents provided such are inert in the reaction. Thus, among the boron compounds which can be employed are boron trichloride, boron trifluoride, boron triiodide, boron tribromide, diethyl boron chloride, amyl boron iodide and the like and the boron esters as for example trimethyl borate, trihexyl borate, triphenyl borate, tricyclohexyl borate, ethyl dimethyl borate, and the like including diethoxy boron fluoride, dimethoxy boron chloride, ethoxy boron difluoride, ethyl diethoxy boron, diethyl methoxy boron, and the like. The boron fluorides, chlorides and esters wherein the hydrocarbon portion is an alkyl group having up to about 8 carbon atoms are preferred. The boron fluorides and chlorides, particularly boron trichloride and boron trifluoride are especially preferred since with these materials undesirable side reactions are diminished.

The unsaturated compound is an organic compound containing one or more carbon to carbon double bonds or carbon to carbon triple bonds in an aliphatic configuration; that is the double bonds of aromatic rings are not included except as inert substituents. Thus, the unsaturated compounds can be depicted by the formula:

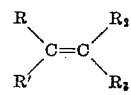

and the formula:

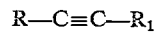

wherein the R's can be the same or different and are hydrogen or organic radicals, preferably hydrocarbon, having up to about 18 carbon atoms. Thus, among such compounds defined thereby are included ethylene, propylene, cis- and trans-2-butene, 1-butene, 1-pentene, 2-pentene, 3-hexene, octenes, 1-diisobutylene, tri-methylethylene, tetramethylethylene, decenes, 1-tetradecene; 1-octadecene; cyclic olefins such as: cyclopentene, cyclohexene, cycloheptene, pinene; substituted olefins such as: 1,1-diphenylethylene, p-nitrostyrene, p-carbethoxy-styrene, styrene, 2-methyl-styrene, methylmethacrylate, m-nitrostyrene, α-methylstyrene, nitroethylene, allylethylether, vinyl butyl ether; of dienes such as butadiene and cyclohexadiene, polyenes such as alloocimene, and acetylenes such as 1-hexyne and 2-hexyne, acetylene, phenyl acetylene, and methyl acetylene. The unsaturated organic compounds may bear certain functional groups which are not significantly reduced by the metal hydride under the reaction conditions. Thus, the term "unsaturated organic compound" also includes nitro olefins, halo olefins (e.g. allyl chloride), unsaturated ethers, unsaturated acid chlorides, unsaturated carboxylic esters (e.g. ethyl oleate), unsaturated borate esters, etc.

The process of this invention will be more completely understood from a consideration of the following examples. All parts are by weight unless otherwise specified.

*Example I*

Into a reactor equipped with means for admitting and discharging reactants and products was added 1.94 parts of 92.4 percent pure sodium hydride, 8.42 parts of 1-hexene and 47 parts of the dimethyl ether of diethylene glycol. To this mixture was then added 19.87 parts of boron trifluoride etherate. The mixture was then allowed to stand at room temperature (25° C.) overnight (about 16 hours). The reaction mixture was then hydrolyzed and the aqueous phase was separated. The organic portion was then subjected to ether extraction with diethyl ether. Upon subsequent evaporation of the ether, there was obtained 3.9 parts of tri-n-hexyl boron representing a yield of 60 percent.

*Example II*

When Example I is repeated employing boron trichloride in place of the boron trifluoride etherate in a molar ratio of 1 mole of boron trichloride per 3 moles of sodium hydride, tri-n-hexyl boron is obtained in high yield.

*Example III*

Employing the procedure of Example I, 1.94 parts of sodium hydride are reacted with 2.8 parts of ethylene and 19.87 parts of boron trifluoride etherate in 75 parts of the methyl ethyl ether of diethylene glycol at 50° C. and at autogenous pressure. Triethyl boron is obtained in high yield.

*Example IV*

When triphenyl borate is substituted for the boron trifluoride etherate in Example III, a high yield of triethyl boron is obtained.

*Example V*

Employing the procedure of Example I with exception that butadiene is substituted for 1-hexene, fractionation of the reaction mixture after hydrolysis results in an oily residue which reacts rapidly with oxygen, indicating the presence of boron in the molecule, and with bromine indicating that some unsaturation remains in the compound.

*Example VI*

Following the procedure of Example V but using 3-hexyne in place of the butadiene, an oily liquid is obtained which contains boron and exhibits unsaturation toward bromine, indicating the formation of a substituted tri-vinyl borane.

*Example VII*

Employing the procedure of Example V with the exception that allyl chloride is substituted for the butadiene, an oily liquid is obtained which contains both chlorine and boron and no unsaturation.

*Example VIII*

When Example I is repeated with the exception that lithium hydride is substituted for the sodium hydride and the temperature employed is 100° C. for 3 hours, tri-n-hexyl boron is obtained in high yield.

*Example IX*

Repeating Example I but employing a suspension of aluminum hydride in diethyl ether as the metal hydride reactant, tri-n-hexyl boron is produced.

*Example X*

When diethylaluminum hydride is reacted with boron trifluoride etherate in the dimethyl ether of diethylene glycol at 125° C. and ethylene, bubbled through the mixture, triethyl boron is obtained in high yield.

*Example XI*

Substituting magnesium hydride for sodium hydride in Example III and triethyl amine for the methyl ethyl ether of diethylene glycol as a diluent, triethyl boron triethyl amine complex is obtained when reacting at 100–125° C.

*Example XII*

When gallium hydride is reacted with styrene and triethyl borate according to the procedure of Example I but at 75° C. for 3 hours in the absence of a diluent, tris-2-phenyl ethyl borane is obtained in high yield.

*Example XIII*

Trivinyl boron is obtained when sodium hydride is reacted with boron tribromide etherate and acetylene at 50° C. for 1½ hours.

*Example XIV*

Employing the procedure of Example I but substituting calcium hydride for sodium hydride and cyclohexene for 1-hexene, tricyclohexyl boron is obtained.

*Example XV*

Example I is repeated substituting 1-decene for 1-hexene and the dimethyl ether of triethylene glycol for the dimethyl ether of diethylene glycol. Tri-n-decyl boron is obtained in high yield.

*Example XVI*

When lithium hydride is reacted with boron trichloride and 2-octene in diethyl ether at room temperature for 16 hours, tri-2-octyl boron is obtained.

*Example XVII*

Sodium hydride is reacted with trimethyl borate and 1-octene in the dimethyl ether of diethylene glycol at reflux temperature for 6 hours. Tri-n-octyl boron is produced in high yield.

*Example XVIII*

Example IX is repeated with the exception that trimethyl borate is substituted for the boron trifluoride etherate to produce tri-n-hexyl boron.

The above examples are given by way of illustration and the invention is not intended to be limited thereby. It is to be understood that the metal hydrides, the boron compounds, and the unsaturated compounds illustrated hereinabove can be substituted in the above examples to produce equivalent results.

The temperature at which the reaction is conducted is subject to considerable latitude. Generally speaking, the reaction will proceed at room temperature and lower and at temperatures approaching the decomposition temperature of the reactants or products. Hence the reaction can be conducted at between about 0 to 200° C. In a preferred embodiment temperatures between about 25 to 125° C. are employed. When employing boron esters, as for example trimethyl borate, enhancement in reaction rate and yield is obtained when the higher temperatures are employed as between about 75 to 125°. Pressure is not essential to the reaction but is desirable in those instances wherein the boron compound is gaseous, as for example boron trichloride. In those instances wherein the unsaturated compound is a gas, pressure above atmospheric, as for example, up to 150 atmospheres can be employed if desired.

The proportions of the reactants employed are likewise subject to considerable latitude but are somewhat dependent upon the particular boron compound employed. In general between about 0.5 to 10 equivalents of the metal hydride per mole of the boron compound are employed. For best results when the boron compound is a chloride, bromide or iodide, it is preferred to employed between 2.5 to 3.5 equivalents of the metal hydride per mole of the boron halide. On the other hand when the boron compound is the fluoride or ester it has been found that between about 0.5 to 1 equivalent of the hydride per mole of the boron compound is employed. The unsaturated compound employed is generally based upon the metal hydride. Since this reactant can be recovered and reused quite readily there is no harm in employing an excess thereof. In general, between about 0.5 to 2 moles of the olefin per equivalent of the metal hydride are used. In those cases wherein the olefin is a liquid under reaction conditions, such an olefin can be employed as a reaction medium and thus much larger quantities are desirable as up to about 15 parts per part of metal hydride.

Although diluents or solvents are not required, their use can be employed to advantage in certain instances. For example, they can be employed to achieve better contact of the reactants and to provide a fluid system. They are particularly useful to assist in keeping the solid metal hydride surface clean when a boron halide is employed as the boron reactant. Thus, in these instances a diluent is preferably employed. Among such diluents which can be employed are the hydrocarbons, and halogen aromatic compounds which are essentially inert to the system. The ethers and tertiary amines are also employable even though they can complex with the boron compounds. Among such diluents are included the hexanes, nonanes, decanes, cyclohexanes, benzene, toluene, dimethyl ether, diethyl ether, diamyl ether, methyl amyl ether, tetrahydrofuran, tetrahydropyran, dioxane, the diethyl, dimethyl, and methyl ethyl ethers of diethylene glycol, methylene chloride, phenyl chloride, tolyl bromide, trimethyl amine, methyl pyridine, triethyl amine and the like. The ethers and tertiary amines comprise preferred diluents because of their reaction promoting effect. The ethers, particularly tetrahydrofuran and the polyethers, such as the dimethyl ether of diethylene glycol, and methyl ethyl ether of diethylene glycol are especially preferred because of their greater solubility for the reactants and products, thus providing ready recovery of the product. Additionally such ethers exhibit a greater catalytic or reaction promoting effect and even shorter reaction times are required when such are employed. The proportions of the diluents employed can be varied over a wide range. In general sufficient diluent is employed to achieve fluidity of the reaction mixture, thus between about 1 to 100 parts of the diluent per part of the metal hydride are employed. In a preferred operation between about 3 to 50 parts of the diluent per part of the metal hydride are used.

The reaction time is not critical and proceeds readily upon contact of the reactants. In general, reaction times up to about 20 hours are quite sufficient whereas the preferred operating time is between 0.5 minute to 8 hours.

A means for agitating the reaction mixture is frequently desirable and can be employed in order to achieve an intimate contact and homogeneous mixture of the reactants. Such a procedure is especially desirable when the hydride is a solid and can be accomplished by conventional agitation means such as turbine agitation, ball milling and the like.

In those instances wherein the metal hydride is a solid it is generally subdivided into particles less than about 1 inch in average diameter. It is preferred that such be employed in a finely divided state as up to about 1000 microns in size.

The mode of addition of the reactants can be accomplished in any sequence or simultaneously. However, in certain combinations a rather vigorous reaction may occur. It is preferred for ease of control that the olefin be present before contact of the hydride with the boron compound. Thus the metal hydride and olefin can be in admixture and then the boron compound added or the metal hydride and boron compound can be added to the olefin separately, or the olefin and boron compound can be added to the metal hydride.

The products produced according to the process of this invention are of considerable utility. For example, tri-n-hexyl boron can be oxidized and hydrolyzed to produce n-hexyl alcohol. Likewise, the organo boron compounds are useful in the formation of catalytic compositions with metal halides, as for example titanium tetrachloride, for the polymerization of olefins, e.g. acrylonitrile. The organoboron compounds are also useful as chemical intermediates for the preparation of organo borinic and boronic acids, for example, when triethyl boron is hydrolyzed with mineral acid, ethyl boronic acid is obtained. These and other uses of the compounds of this invention will be evident to those skilled in the art.

Having thus described the process of this invention it is not intended that it be limited except as set forth in the following claims.

I claim:

1. A process for the preparation of organoboron compounds which comprises reacting a metal hydride of a metal of the first three A-groups of the periodic chart of the elements with a boron compound selected from the group consisting of boron trihalides, lower alkyl boron halides, and boron esters wherein the ester groups are hydrocarbon selected from the group consisting of alkyl, cycloalkyl, and aryl groups containing up to about 18 carbon atoms, and an unsaturated hydrocarbon compound containing up to about 30 carbon atoms which is not significantly reduced by said metal hydride under the reaction conditions.

2. A process for the preparation of tri-n-hexyl boron which comprises reacting sodium hydride with 1-hexene and boron trifluoride at a temperature between about 25 to 125° C. in the presence of a saturated liquid polyether.

3. The process of claim 2 wherein said polyether is the dimethyl ether of diethylene glycol.

4. The process of claim 1 wherein said boron compound is a boron trihalide and said unsaturated hydrocarbon compound is an olefin.

5. The processs of claim 4 wherein the reaction is conducted at a temperature between about 25 to 125° C. in the presence of a saturated liquid polyether.

6. A process for the preparation of triethyl boron which comprises reacting sodium hydride with ethylene and boron trifluoride at a temperature between about 25 to 125° C. in the presence of the methyl ethyl ether of diethylene glycol.

7. The process of claim 5 further characterized in that said olefin is propylene, said metal hydride is sodium hydride, and said boron trihalide is boron trifluoride.

8. The process of claim 5 further characterized in that said olefin is 1-butene, said metal hydride is sodium hydride, and said boron trihalide is boron trifluoride.

9. The process of claim 5 further characterized in that said olefin is 1-octadecene, said metal hydride is sodium hydride, and said boron trihalide is boron trifluoride.

References Cited in the file of this patent

UNITED STATES PATENTS

| | | |
|---|---|---|
| 2,494,968 | Schlesinger et al. | Jan. 17, 1950 |
| 2,544,472 | Schlesinger et al. | Mar. 6, 1951 |

OTHER REFERENCES

Lappert: Chem. Reviews, vol. 56, pp. 963 to 976 (1956).

The Van Nostrand Chemist's Dictionary, D. Van Nostrand Co., New York, 1953, page 17.

Hurd: J. Am. Chem. Soc., vol. 70, pages 2053–5 (1948).